United States Patent
Konishi et al.

(10) Patent No.: US 10,047,009 B2
(45) Date of Patent: Aug. 14, 2018

(54) CEMENT MORTAR COMPOSITION

(71) Applicant: SHIN-ETSU CHEMICAL CO., LTD., Tokyo (JP)

(72) Inventors: Hidekazu Konishi, Joetsu (JP); Tsutomu Yamakawa, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/445,201

(22) Filed: Feb. 28, 2017

(65) Prior Publication Data

US 2017/0260094 A1    Sep. 14, 2017

(30) Foreign Application Priority Data

Mar. 10, 2016 (JP) ................. 2016-046488

(51) Int. Cl.
| | | |
|---|---|---|
| C04B 24/26 | (2006.01) |
| C04B 24/38 | (2006.01) |
| C04B 14/06 | (2006.01) |
| C04B 28/04 | (2006.01) |
| C04B 28/02 | (2006.01) |
| C04B 103/00 | (2006.01) |
| C04B 103/44 | (2006.01) |
| C04B 103/46 | (2006.01) |
| C04B 111/00 | (2006.01) |

(52) U.S. Cl.
CPC ............ *C04B 24/383* (2013.01); *C04B 14/06* (2013.01); *C04B 24/2652* (2013.01); *C04B 24/38* (2013.01); *C04B 28/02* (2013.01); *C04B 28/04* (2013.01); *C04B 2103/0053* (2013.01); *C04B 2103/44* (2013.01); *C04B 2103/46* (2013.01); *C04B 2111/00517* (2013.01); *C04B 2111/00637* (2013.01)

(58) Field of Classification Search
CPC ... C04B 24/383; C04B 28/04; C04B 24/2652; C04B 14/06; C04B 24/38; C04B 2103/0053
USPC .............................................. 524/5
See application file for complete search history.

(56) References Cited

U.S. PATENT DOCUMENTS 4,654,085 A * 3/1987 Schinski ............... C04B 24/383
                                                              524/2

FOREIGN PATENT DOCUMENTS

| | | |
|---|---|---|
| CN | 102381858 | * 3/2012 |
| CN | 102381858 A | 3/2012 |
| EP | 2 939 990 A2 | 11/2015 |
| JP | 2007-269501 A | 10/2007 |

OTHER PUBLICATIONS

Translation of CN102381858, Mar. 21, 2012. (Year: 2012).*
Extended European Search Report dated Aug. 4, 2017, in European Patent Application No. 17158007.9.

* cited by examiner

*Primary Examiner* — Hui Chin
(74) *Attorney, Agent, or Firm* — Birch, Stewart, Kolasch & Birch, LLP

(57) ABSTRACT

A cement mortar composition comprising a water-soluble cellulose ether, a starch derivative originating from tapioca, cement, an aggregate, and water has advantages including a less change of flow with time, easy application with a trowel, a short setting time, and a reduction of construction time.

11 Claims, No Drawings

CEMENT MORTAR COMPOSITION

CROSS-REFERENCE TO RELATED APPLICATION

This non-provisional application claims priority under 35 U.S.C. § 119(a) on Patent Application No. 2016-046488 filed in Japan on Mar. 10, 2016, the entire contents of which are hereby incorporated by reference.

TECHNICAL FIELD

This invention relates to a cement mortar composition and more particularly to a cement mortar composition having advantages including a less change of flow with time, easy application with a trowel, a short setting time, and a reduction of construction time.

BACKGROUND ART

Plastering materials, typically cement mortar compositions are commonly applied with trowels. In the past, glue obtained from seaweed such as red algae is added to cement mortar compositions to ensure effective operation upon application. Then water-soluble cellulose ethers were developed as semi-synthetic resin and are widely used.

The cement mortar compositions are required to have several physical properties including good workability (easy to apply or finish with a trowel), high water retention (to prevent under-setting due to dry-out), and anti-sagging (to prevent tiles from slipping out of place). These requirements become severer as working sites become more efficient.

For example, Patent Document 1 proposes to use a methyl cellulose thickener and a modified starch. Since the grade of a starting material or origin for the modified starch is not specified, the method of Patent Document 1 sometimes fails to meet the desired properties. For example, the efficiency of trowel application is not fully improved, and the setting time is substantially prolonged.

CITATION LIST

Patent Document 1: JP-A 2007-269501

DISCLOSURE OF INVENTION

An object of the invention is to provide a cement mortar composition having advantages including a less change of flow with time, easy application with a trowel, a short setting time, and a possible reduction of construction time.

The inventors have found that the above and other objects are achieved using a water-soluble cellulose ether and a starch derivative originating from tapioca. Namely, by blending a water-soluble cellulose ether, a starch derivative originating from tapioca, cement, an aggregate, water, and optionally a polyacrylamide to formulate a cement mortar composition, there are obtained advantages including a less change of flow with the lapse of time, easy and stable application with a trowel, a short setting time, and a possible reduction of construction time. There are obtained effects of significance which are not achievable with the use of a starch derivative originating from potato.

According to the invention, there is provided a cement mortar composition comprising a water-soluble cellulose ether, a starch derivative originating from tapioca, cement, an aggregate, and water.

The cement mortar composition may further comprise a polyacrylamide.

In a preferred embodiment, the water-soluble cellulose ether is a hydroxyalkyl alkylcellulose, more preferably hydroxypropyl methylcellulose and/or hydroxyethyl methylcellulose. Also preferably, the hydroxyalkyl alkyl cellulose has a degree of alkyl substitution of 1 to 2 and a molar number of hydroxylakyl substitution of 0.05 to 0.45.

In a preferred embodiment, the starch derivative is a hydroxypropylated starch and/or hydroxyethylated starch.

In a preferred embodiment, the water-soluble cellulose ether and the starch derivative are present in a weight ratio between 51:49 and 99:1.

Advantageous Effects of Invention

The cement mortar composition of the invention has advantages including a less change of flow with the lapse of time, easy application with a trowel, a short setting time, and a possible reduction of construction time.

DESCRIPTION OF PREFERRED EMBODIMENTS

The cement mortar composition of the invention is defined as comprising a water-soluble cellulose ether, a starch derivative originating from tapioca, cement, an aggregate, water, and optionally a polyacrylamide.

A water-soluble cellulose ether is included in the cement mortar composition to ensure water retention and plasticity. Examples of the water-soluble cellulose ether include hydroxyalkyl alkylcelluloses such as hydroxypropyl methylcellulose (HPMC), hydroxyethyl methylcellulose (HEMC) and hydroxyethyl ethylcellulose, hydroxyalkyl celluloses such as hydroxyethyl cellulose and hydroxypropyl cellulose, and alkyl celluloses such as methyl cellulose. From the standpoints of water retention and trowel application, it is preferred to use the hydroxyalkyl alkylcelluloses, most preferably hydroxypropyl methylcellulose and hydroxyethyl methylcellulose.

From the standpoints of water retention and set retarding, the water-soluble cellulose ether should preferably have a degree of alkyl substitution of 1 to 2, more preferably 1.2 to 1.9, and even more preferably 1.4 to 1.8 and a molar substitution of hydroxyalkyl of 0.05 to 3, more preferably 0.1 to 2.9, and even more preferably 0.15 to 2.8.

Specifically, the hydroxyalkyl alkylcellulose should preferably have a degree of alkyl substitution of 1.0 to 2.0, more preferably 1.2 to 1.9, and even more preferably 1.4 to 1.8, and a molar substitution of hydroxyalkyl of 0.05 to 0.45, more preferably 0.10 to 0.40, and even more preferably 0.15 to 0.35. The hydroxyalkyl cellulose should preferably have a molar substitution of hydroxyalkyl of 0.05 to 3.00, more preferably 0.10 to 2.90, and even more preferably 0.15 to 2.80. The alkyl cellulose should preferably have a degree of alkyl substitution of 1.0 to 2.0, more preferably 1.2 to 1.9, and even more preferably 1.4 to 1.8.

Notably, for the water-soluble cellulose ether, the degree of alkyl substitution is an average number of hydroxyl groups substituted by alkoxy groups per glucose ring unit of the cellulose, and the molar substitution of hydroxyalkyl is an average molar number of hydroxyalkyl groups added per glucose ring unit of the cellulose. The degree of alkyl substitution (DS) and molar substitution of hydroxyalkyl (MS) may be computed from the values measured by the analysis of DS of hypromellose (hydroxypropyl methylcellulose) prescribed in the Japanese Pharmacopoeia, 16th Edition.

Preferably from the standpoints of water retention and trowel application, the water-soluble cellulose ether forms a 1 wt % aqueous solution having a viscosity of 5 to 30,000 mPa·s, more preferably 10 to 25,000 mPa·s, even more preferably 15 to 23,000 mPa·s, and most preferably 30 to 22,000 mPa·s, as measured at 20° C. by a B-H viscometer at 20 rpm.

Preferably from the standpoints of water retention and trowel application, the water-soluble cellulose ether is added in an amount of 0.02 to 1.2 parts, more preferably 0.03 to 0.7 part, and even more preferably 0.04 to 0.55 part by weight per 100 parts by weight of the cement and aggregate combined (referred to as the total of main ingredients, hereinafter).

According to the invention, a starch derivative originating from tapioca is used for the purpose of improving the efficiency of trowel application. As compared with starch derivatives originating from other materials such as potato, the starch derivative originating from tapioca little retards the setting of cement, leading to a possible reduction of construction time.

Examples of the starch derivative originating from tapioca include hydroxypropylated starch and hydroxyethylated starch, which may be used alone or in admixture. Inter alia, hydroxypropylated starch is most effective for improving the efficiency of trowel application.

From the standpoint of trowel application, the starch derivative should preferably have a molar substitution of 0.01 to 0.5, more preferably 0.05 to 0.45, and even more preferably 0.10 to 0.40. The term "molar substitution" of the starch derivative refers to a molar number of substituent groups such as hydroxypropyl or hydroxyethyl groups added per glucose ring of the starch. The molar substitution of a starch derivative may be measured by the method described in "Starch and Related Glucide Experiment Method" (Nakamura and Kainuma Ed., Gakkai Shuppan Center).

Preferably from the standpoint of trowel application, the starch derivative originating from tapioca forms a 5 wt % aqueous solution having a viscosity of 5 to 50,000 mPa·s, more preferably 10 to 40,000 mPa·s, even more preferably 20 to 30,000 mPa·s, and most preferably 40 to 20,000 mPa·s, as measured at 20° C. by a B-H viscometer at 20 rpm.

Preferably from the standpoint of trowel application, the starch derivative originating from tapioca is added in an amount of 0.002 to 0.6 part, more preferably 0.015 to 0.3 part, and even more preferably 0.02 to 0.2 part by weight per 100 parts by weight of the total of main ingredients.

Also preferably the water-soluble cellulose ether and the starch derivative originating from tapioca are present in a weight ratio between 51:49 and 99:1, more preferably between 60:40 and 97:3, and even more preferably between 70:30 and 95:5. An addition ratio in the range ensures more water retention and efficient trowel application. Outside the range, both water retention and trowel application may not be satisfactory.

Examples of the cement used herein include normal Portland cement, high-early-strength Portland cement, moderate heat Portland cement, Portland blast-furnace slag cement, silica cement, fly ash cement, alumina cement, and ultra-high-early-strength Portland cement.

Preferably from the standpoints of strength and surface cracking after setting, the cement is added in an amount of 15 to 85 parts, more preferably 20 to 80 parts, and even more preferably 25 to 75 parts by weight per 100 parts by weight of the total of main ingredients.

Suitable aggregates are those commonly used as fine aggregates in ready mixed concretes and plasters, and include river sand, pit sand, beach sand, land sand, and siliceous sand. The aggregate has a particle size of preferably 0.075 to 5 mm, more preferably 0.075 to 2 mm, and even more preferably 0.075 to 1 mm.

The aggregate is preferably added in an amount of 15 to 85 parts, more preferably 20 to 80 parts, and even more preferably 25 to 75 parts by weight per 100 parts by weight of the total of main ingredients. It is noted that the total of cement and aggregate is 100 parts by weight.

A portion of the aggregate may be replaced by an inorganic or organic extender. Suitable inorganic extenders include fly ash, blast furnace slag, talc, calcium carbonate, ground marble, ground limestone, perlite, and sirasu balloons. Suitable organic extenders include expanded styrene beads and expanded ethylene vinyl alcohol in finely divided form. While the inorganic or organic extender commonly used in the art has a particle size of up to 5 mm, the same is preferably used herein.

From the standpoints of strength, ingredient separation and trowel application, water is preferably added in an amount of 15 to 40 parts, more preferably 16 to 37 parts, and even more preferably 17 to 35 parts by weight per 100 parts by weight of the total of main ingredients.

In the cement mortar composition, a water-soluble polymer other than the aforementioned may be added for the purpose of preventing the composition from sagging. Suitable water-soluble polymers include synthetic polymers such as polyacrylamide, polyvinyl alcohol, and polyethylene glycol, and naturally occurring polymers such as pectin, gelatin, casein, welan gum, gellan gum, locust bean gum, and guar gum. Of these, polyacrylamide is preferably used for the anti-sagging purpose.

When the water-soluble polymer, especially polyacrylamide is added for anti-sagging, it is preferably used in an amount of 0.0005 to 0.1 part, more preferably 0.001 to 0.05 part by weight per 100 parts by weight of the total of main ingredients.

To the cement mortar composition, any other additives such as well-known water reducing agents, set retarders, set accelerators, polymer emulsion, and organic short fibers may be added if necessary and as long as the benefits of the invention are not impaired. Such additives may be added in ordinary amounts as long as the benefits of the invention are not impaired.

EXAMPLE

Examples of the invention are given below by way of illustration and not by way of limitation.

Examples and Comparative Examples

Ingredients
(1) Water-soluble cellulose ether listed in Table 1
(2) Starch derivative listed in Table 2
(3) Polyacrylamide SS-200 (Hymo Co., Ltd.)
(4) Cement: normal Portland cement (Taiheiyo Materials Corp.)
(5) Aggregate: siliceous sand #56 (Mikawa Keiseki Co.)
(6) Water
It is noted that in Tables 1 and 2, HPMC is hydroxypropyl methylcellulose, HEMC is hydroxyethyl methylcellulose, and HPS is hydroxypropylated starch.

In Table 1, a degree of alkyl substitution (DS) and molar substitution of hydroxyalkyl (MS) are computed from the values measured by the analysis of DS of hypromellose (hydroxypropyl methylcellulose) prescribed in the Japanese Pharmacopoeia, 16th Edition. In Table 2, the molar substitution (MS) is a molar number of substituent groups added per glucose ring of starch, which is measured by the method described in "Starch and Related Glucide Experiment Method" (Nakamura and Kainuma Ed., Gakkai Shuppan Center).

In Tables 1 and 2, the viscosity is as measured by a B-H viscometer at 20 rpm.

TABLE 1

| Sample No. | Type | DS | MS | Viscosity of 1 wt % solution (mPa · s) |
|---|---|---|---|---|
| 1 | HPMC | 1.8 | 0.16 | 1,510 |
| 2 | HPMC | 1.4 | 0.20 | 1,490 |
| 3 | HEMC | 1.5 | 0.33 | 2,380 |

TABLE 2

| Sample No. | Origin | Type | MS | Viscosity of 5 wt % solution (mPa · s) |
|---|---|---|---|---|
| A | tapioca | HPS | 0.11 | 46.9 |
| B | tapioca | HPS | 0.33 | 4,620 |
| C | potato | HPS | 0.36 | 232 |

The above ingredients were mixed by the following procedure to prepare a cement mortar composition, which was tested by the following methods. The results are shown in Tables 3 and 4.

Cement Mortar Mixing Procedure

A dry blend of powder ingredients (cement, aggregate, water-soluble cellulose ether, starch derivative, and polyacrylamide) was admitted into a 5-L mortar mixer. While the powder ingredients were mixed, a predetermined amount of water was added. Mixing was continued at a low speed for 3 minutes before the tests. Notably pbw is parts by weight.

Test Methods

1) Cement mortar temperature

The temperature of ingredients was adjusted such that the cement mortar composition was at 20±3° C. at the end of mixing.

2) Table flow test
    according to JIS R 5201
3) Consistency change
    according to JIS A 6916
4) Water retention
    according to JIS A 6916
5) Weight of unit volume
    according to JIS A 1171
6) Setting start time
    according to JIS A 6204
7) Flexural strength
    prepared according to JIS R 5201,
    cured according to JIS A 1171
8) Ease of trowel application (sensory test)

An average of ratings by five workers is reported. The sensory test included 5 ratings, with a rating of 5 for easiest to apply with a trowel, 1 for most difficult to apply, and 3 for ordinary level.

TABLE 3

| Ingredients | | Unit | Example 1 | 2 | 3 | 4 | 5 | 6 | 7 | 8 |
|---|---|---|---|---|---|---|---|---|---|---|
| Water-soluble cellulose ether | Sample | — | 1 | 2 | 3 | 1 | 2 | 3 | 1 | 1 |
| | Amount | pbw | 0.16 | 0.16 | 0.16 | 0.16 | 0.16 | 0.16 | 0.14 | 0.18 |
| Starch derivative | Sample | — | A | A | A | B | B | B | A | A |
| | Amount | pbw | 0.04 | 0.04 | 0.04 | 0.04 | 0.04 | 0.04 | 0.06 | 0.02 |
| Cellulose ether/starch derivative | | weight ratio | 4:1 | 4:1 | 4:1 | 4:1 | 4:1 | 4:1 | 7:3 | 9:1 |
| Polyacrylamide | | pbw | 0.002 | 0.002 | 0.002 | 0.002 | 0.002 | 0.002 | 0.002 | 0.002 |
| Cement | | pbw | 50 | 50 | 50 | 50 | 50 | 50 | 50 | 50 |
| Aggregate | | pbw | 50 | 50 | 50 | 50 | 50 | 50 | 50 | 50 |
| Water | | pbw | 21 | 21 | 21 | 21 | 21 | 21 | 21 | 21 |
| Test results | | | | | | | | | | |
| Cement mortar temperature | | ° C. | 20.9 | 19.8 | 21.0 | 20.6 | 20.3 | 19.8 | 20.5 | 19.7 |
| Table flow | | mm | 170 | 166 | 166 | 167 | 167 | 164 | 174 | 167 |
| Consistency change | | % | 0 | −3.0 | −2.4 | −1.8 | −3.6 | −4.3 | 1.1 | −1.8 |
| Water retention | | % | 84.0 | 83.5 | 83.6 | 88.1 | 83.1 | 81.4 | 81.0 | 87.5 |
| Weight of unit volume | | g/ml | 1.68 | 1.67 | 1.62 | 1.62 | 1.62 | 1.59 | 1.74 | 1.67 |
| Setting start time | | h-m | 6-55 | 10-20 | 10-50 | 7-55 | 10-10 | 10-30 | 9-25 | 6-20 |
| Flexural strength | | N/mm$^2$ | 6.5 | 6.4 | 6.1 | 6.2 | 6.0 | 5.9 | 7.1 | 6.4 |
| Ease of trowel application | | — | 5 | 5 | 4 | 5 | 4 | 4 | 5 | 4 |

TABLE 4

| Ingredients | | Unit | Comparative Example 1 | 2 | 3 |
|---|---|---|---|---|---|
| Water-soluble cellulose ether | Sample | — | 1 | 2 | 3 |
| | Amount | pbw | 0.16 | 0.16 | 0.16 |
| Starch derivative | Sample | — | C | C | C |
| | Amount | pbw | 0.04 | 0.04 | 0.04 |
| Cellulose ether/starch derivative | | weight ratio | 4:1 | 4:1 | 4:1 |

TABLE 4-continued

|  |  | Comparative Example | | |
|---|---|---|---|---|
| Ingredients | Unit | 1 | 2 | 3 |
| Polyacrylamide | pbw | 0.002 | 0.002 | 0.002 |
| Cement | pbw | 50 | 50 | 50 |
| Aggregate | pbw | 50 | 50 | 50 |
| Water | pbw | 21 | 21 | 21 |
| Test results | | | | |
| Cement mortar temperature | ° C. | 21.9 | 22.1 | 21.2 |
| Table flow | mm | 168 | 169 | 160 |
| Consistency change | % | −5.9 | −7.7 | −7.9 |
| Water retention | % | 79.5 | 78.3 | 77.7 |
| Weight of unit volume | g/ml | 1.65 | 1.66 | 1.59 |
| Setting start time | h-m | 11-20 | 14-25 | 14-40 |
| Flexural strength | N/mm$^2$ | 6.3 | 6.3 | 5.8 |
| Ease of trowel application | — | 3 | 2 | 2 |

As seen from Table 3, the cement mortar compositions containing water-soluble cellulose ether and starch derivative originating from tapioca within the scope of the invention (Examples 1 to 8) showed desired properties including a percent consistency change of approximately 0 (a minimal change of flow with time), a short setting start time, and ease of trowel application. In contrast, as seen from Table 4, the cement mortar compositions containing starch derivative originating from potato (Comparative Examples 1 to 3) showed a marked consistency change (a large change of flow with time) and less water retention, adversely affecting trowel application.

Japanese Patent Application No. 2016-046488 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A cement mortar composition comprising
   a water-soluble cellulose ether,
   a starch derivative originating from tapioca and having a molar substitution of 0.05 to 0.33, wherein the starch derivative originating from tapioca is a hydroxypropylated tapioca starch and/or a hydroxyethylated tapioca starch,
   cement,
   an aggregate, and
   water.

2. The cement mortar composition of claim 1, further comprising a polyacrylamide.

3. The cement mortar composition of claim 1, wherein the water-soluble cellulose ether is a hydroxyalkyl alkylcellulose.

4. The cement mortar composition of claim 3, wherein the hydroxyalkyl alkylcellulose is hydroxypropyl methylcellulose and/or hydroxyethyl methylcellulose.

5. The cement mortar composition of claim 3, wherein the hydroxyalkyl alkylcellulose has a degree of alkyl substitution of 1 to 2 and a molar number of hydroxyalkyl substitution of 0.05 to 0.45.

6. The cement mortar composition of claim 1, wherein the water-soluble cellulose ether and the starch derivative originating from tapioca are present in a weight ratio between 51:49 and 99:1.

7. The cement mortar composition of claim 6, wherein the water-soluble cellulose ether and the starch derivative originating from tapioca are present in a weight ratio between 70:30 and 95:5.

8. The cement mortar composition of claim 5, wherein the hydroxyalkyl alkylcellulose has a degree of alkyl substitution of 1.4 to 1.8 and a molar substitution of hydroxyalkyl of 0.15 to 0.35.

9. The cement mortar composition of claim 1, comprising
   15 to 85 parts by weight per 100 parts by weight of the cement and aggregate present in the cement mortar composition of a cement selected from the group consisting of normal Portland cement, high-early-strength Portland cement, moderate heat Portland cement, Portland blast-furnace slag cement, silica cement, fly ash cement, alumina cement, and ultra-high-early-strength Portland cement and
   15 to 85 parts by weight per 100 parts by weight of the cement and aggregate present in the cement mortar composition of an aggregate selected from the group consisting of river sand, pit sand, beach sand, land sand, and siliceous sand.

10. The cement mortar composition of claim 1, comprising 15 to 40 parts by weight of water per 100 parts by weight of the cement and aggregate present in the cement mortar composition.

11. The cement mortar composition of claim 2, comprising 0.001 to 0.05 part by weight of polyacrylamide per 100 parts by weight of the cement and aggregate present in the cement mortar composition.

* * * * *